Patented Apr. 3, 1945

2,373,030

UNITED STATES PATENT OFFICE 2,373,030

PRODUCTION OF ETHYL BENZENE

Charles N. Kimberlin, Jr., Baton Rouge, La., assignor to Standard Oil Development Company, a corporation of Delaware No Drawing. Application July 12, 1941,
Serial No. 402,191

3 Claims. (Cl. 260—671)

The present invention is concerned with the production of ethyl benzene. The invention is more particularly concerned with an improved catalyst for utilization in a reaction involving ethylene and benzene. In accordance with the present invention, benzene and ethylene are reacted employing a catalyst comprising a nonmetallic halide and a Friedel-Crafts type catalyst.

It is known in the art to produce mono-ethyl benzene by reacting benzene and ethylene under suitable temperature and pressure conditions. These reactions are generally conducted at a temperature range from about 120° F. to about 250° F. Catalysts generally employed are conventional Friedel-Crafts type catalysts such as the various metallic halides, as for example aluminum chloride, zinc chloride, and iron chloride. In these reactions, certain difficulties are encountered. For instance, in the production of mono-ethyl benzene, a relatively high percentage of polyethyl benzenes are produced, as well as other reaction products. Furthermore, the yield of mono-ethyl benzene per unit weight of catalyst is relatively low. I have now discovered a process whereby a maximum yield of mono-ethyl benzene may be secured with a minimum consumption of catalyst. In accordance with my invention the reaction is conducted in the presence of a catalyst comprising a Friedel-Crafts type catalyst and a suitable non-metallic halide.

The Friedel-Crafts type catalyst may comprise any conventional catalyst of this class, such as the various metallic halides as, for example, zinc chloride and iron chloride. I, however, prefer to use aluminum chloride in my process. The non-metallic halide which I use in conjunction with the aluminum chloride preferably comprises hydrogen chloride, however other substances are satisfactory such as the various alkyl halides as, for example, ethyl chloride, carbon tetra-chloride, and chloroform.

The amount of non-metallic halide employed in conjunction with the Friedel-Crafts catalyst may vary considerably, depending upon various operating conditions and the particular Friedel-Crafts catalyst employed. For example, when employing hydrogen chloride in conjunction with aluminum chloride the amount of hydrogen chloride may vary from 3% to 100%, based upon the volume of ethylene feed. However, in general, I prefer to use at least 20% of hydrogen chloride or alkyl halide based upon the volume of ethylene feed. It is preferred that the alkyl halide be employed in conjunction with hydrogen chloride and that the total be at least 20% based on the volume of ethylene.

The reaction may be carried out under any suitable temperature and pressure conditions. In general, the temperature of the reaction is in the range from about 140° F. to about 200° F. A satisfactory operating temperature is about 160° F. The mole ratio of the ethylene feed to benzene feed passed to the reaction zone likewise may vary considerably. In general, an appreciable excess of benzene over the stoichiometric amount needed is employed. I have found that approximately 0.2 to 0.4 mole of ethylene per 1.0 mole of benzene is satisfactory. It is preferred that the hydrogen chloride be recovered from the reaction product and recycled to the reaction zone. The reaction products may be treated to separate the desired mono-ethyl benzene as well as di-ethyl benzene and higher boiling ethylene products.

In order to further illustrate my invention, the following examples are given which should not be construed as limiting the same in any manner whatsoever:

*Example 1.*—A number of operations were conducted in which 0.3 mole of ethylene was treated with 1.0 mole of benzene at a temperature of 160° F. The catalyst employed in the various operations consisted of aluminum chloride and various concentrations of hydrogen chloride. The results of these operations were as follows:

| Operation | Mole percent of hydrogen chloride employed based upon the feed volume of ethylene | Yield in pounds of ethyl benzene per pound of aluminum chloride |
|---|---|---|
| 1 | 0 | 8.0 |
| 2 | 3.0 | 14.7 |
| 3 | 7.0 | 16.0 |
| 4 | 9.0 | 15.2 |
| 5 | 23.0 | 33.8 |
| 6 | 26.0 | 38.0 |

From the above it is apparent that an appreciable increase in yield per unit of catalyst is secured in accordance with my invention.

*Example 2.*—In an operation conducted under conditions described with respect to Example 1, 10% of ethyl chloride was employed based upon the volume of ethylene feed. The results of this operation were as follows:

| Operation | Mole percent of ethyl chloride employed based upon the feed volume of ethylene | Yield in pounds of ethyl benzene per pound of aluminum chloride |
|---|---|---|
| 1 | 0 | 8.0 |
| 2 | 10 | 14.0 |

From the above it is apparent that unexpected desirable results are secured in accordance with my process.

What I claim as new and wish to protect by Letters Patent are:

1. Process for the production of mono-ethyl benzene which comprises reacting ethylene and benzene in the presence of a catalyst comprising an aluminum halide and a hydrogen halide, the amount of hydrogen halide being in the range from about 20 to about 100 mole per cent based upon the ethylene feed, separating the reaction product, recovering the hydrogen halide and recycling the same.

2. Process for the production of mono-ethyl benzene which comprises reacting ethylene and benzene in the presence of an aluminum chloride catalyst and a non-metallic chloride promoter which yields hydrogen chloride under the conditions of the reaction, the amount of said promoter being in the range from about 20 to about 100 mole per cent based upon the ethylene feed.

3. Process for the production of mono-ethyl benzene which comprises reacting ethylene and benzene in the presence of a catalyst consisting of aluminum chloride and hydrogen chloride at a temperature in the range from about 140° F. to 200° F., the amount of hydrogen chloride being in the range from about 20 to about 100 mole per cent based upon the ethylene feed.

CHARLES N. KIMBERLIN, Jr.